United States Patent [19]

Retallick et al.

[11] 4,350,617

[45] Sep. 21, 1982

[54] CYLINDRICAL METAL HONEYCOMB CATALYST SUPPORTS, AND METHOD FOR FORMING THEM

[76] Inventors: William B. Retallick, 1432 Johnny's Way, West Chester, Pa. 19380; Harold R. Smithson, 880 E. Street Rd., Box 11, Westtown, Pa. 19395

[21] Appl. No.: 255,568

[22] Filed: Apr. 20, 1981

[51] Int. Cl.$^3$ ............................................. B01J 35/04
[52] U.S. Cl. ................................................. 252/477 R
[58] Field of Search ................ 252/477 R; 29/157 R; 156/197; 422/177, 180; 428/116, 593; 138/148

[56] References Cited

U.S. PATENT DOCUMENTS

| 3,891,575 | 6/1975 | Bräutigam et al. | 252/477 R |
| 3,983,283 | 9/1976 | Bagley | 252/477 R |
| 4,162,993 | 7/1979 | Retallick | 252/477 R |

FOREIGN PATENT DOCUMENTS 2815317  10/1979  Fed. Rep. of Germany ...... 422/180

*Primary Examiner*—W. J. Shine
*Attorney, Agent, or Firm*—Paul and Paul

[57] ABSTRACT

A metal honeycomb catalyst support is formed by stacking flat strips of metal into a cylindrical shell. The shell is divided by a partition along the axis of the shell. The strips are stacked parallel to the partition. The partition insures that the strips lie flat and are tightly compacted. Indentations in the strips maintain the spacing between the strips. The present invention provides an economical method for making small numbers of honeycombs, which method does not require the use of expensive machinery.

10 Claims, 3 Drawing Figures

CYLINDRICAL METAL HONEYCOMB CATALYST SUPPORTS, AND METHOD FOR FORMING THEM

BACKGROUND OF THE INVENTION

A honeycomb catalyst support can be formed by winding a single strip of metal upon itself, as is described in U.S. Pat. No. 4,162,993, the disclosure of which is incorporated by reference herein. The cross section of this spirally wound honeycomb is circular, which is the most useful cross section for small honeycombs. The spacing between adjacent layers in the spiral is maintained by indentations in the strip. The rotary die for indenting a long strip is expensive, and so is the machinery for winding the long strip into a honeycomb. The expense is justified for mass production, but not for making small numbers of honeycombs for testing. This invention provides a method for forming circular honeycombs by stacking short strips that can be indented one at a time in a hand operated die. The expensive rotary die is eliminated, and so is the winding machinery. The invention provides a cylindrical frame having a flat partition along the axis of the cylinder. Each semicircle is packed with strips that lie parallel to the partition. The partition insures that the strips lie parallel and are tightly packed.

SUMMARY OF THE INVENTION

A cylindrical honeycomb is formed by stacking flat strips into a cylindrical frame having a partition along the axis of the cylinder. The first strip is laid against the partition, and a second strip is laid adjacent the first, and so on until one semicircle of the frame is filled. Then the other semicircle is filled in the same way. Starting at the partition and stacking toward the circle insures that the strips lie flat and are tightly packed. The indented strips are resilient and must be compressed somewhat to form a stack that is uniformly spaced. When a semicircle is partly filled with strips and the compressing force is directed toward the partition, all of the compressive force is exerted on the strips, and none of the force is absorbed by the circular frame. Thus the strips are compressed uniformly along their length, and the spacing between strips is uniform.

The usefulness of the partition is not confined to circular cross sections. A partition could serve the same purpose in an ellipse, or in any cross section having a curved perimeter. If the cross section be large, more than one parallel partition can be used. The partition is essential for stacking up the honeycomb, but the partition can be removed after all of the strips have been inserted in the frame.

Accordingly, a primary object of the present invention is to provide an economical method of making a small number of cylindrical metal catalyst supports.

It is a further object of the invention to provide metal catalyst supports of varying cross sections, wherein the catalyst supports can be economically produced.

It is a further object of the invention to provide metal catalyst supports, which supports have frames with varying numbers of partitions.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
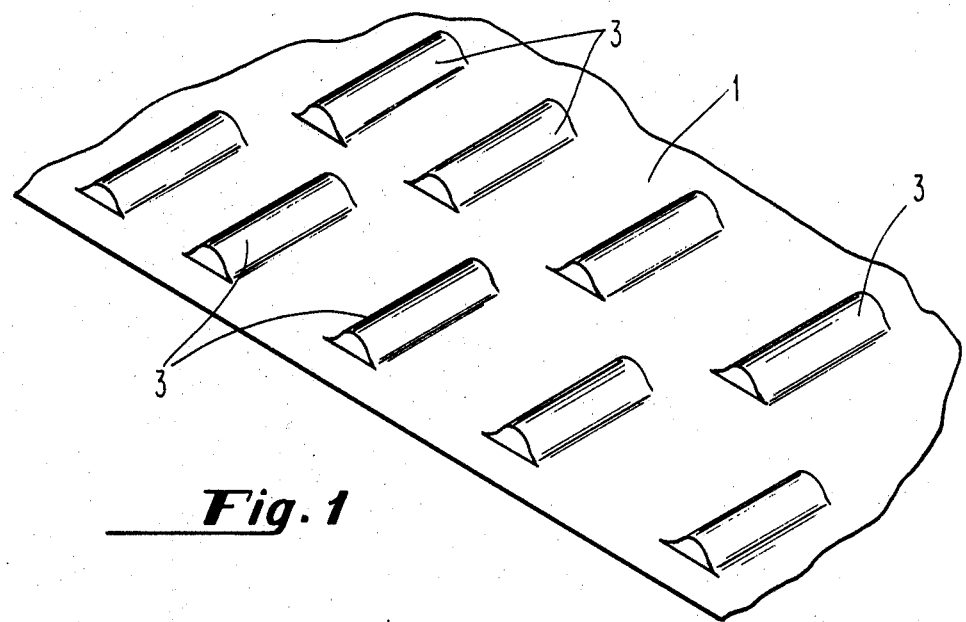
FIG. 1 is a fragmentary perspective view of an indented metal strip which is used to build a catalyst support according to the present invention.

FIG. 1 is a fragmentary perspective view of a strip which is used to build the metal catalyst support of the present invention. Strip 1 has a plurality of indentations 3. The purpose of the indentations is to provide for spacing of adjacent strips 1, when the strips are stacked on top of each other. Indentations 3 can be formed by a hand-operated die. The only restriction on the position of the indentations 3 on strip 1 is that the indentations on adjacent strips must not be located in the same relative position on the strips, so that the strips 1 do not nest together. The ends of the indentations 3 are open so that only the edge of the indented metal is presented to the flowing gas. The gas can flow through the catalyst support because the indentations 3 are staggered, so that the strips do not nest together.

Of course, instead of indentations having cylindrical contours, such as those shown in FIG. 1, the strips could have corrugations like those described in U.S. Pat. No. 3,770,389 and 3,891,575, the disclosures of which are incorporated by reference herein. However, if such corrugations are used, the corrugated strips would alternate with flat strips having no corrugations, so as to prevent nesting of adjacent corrugated strips.

Figure 2:
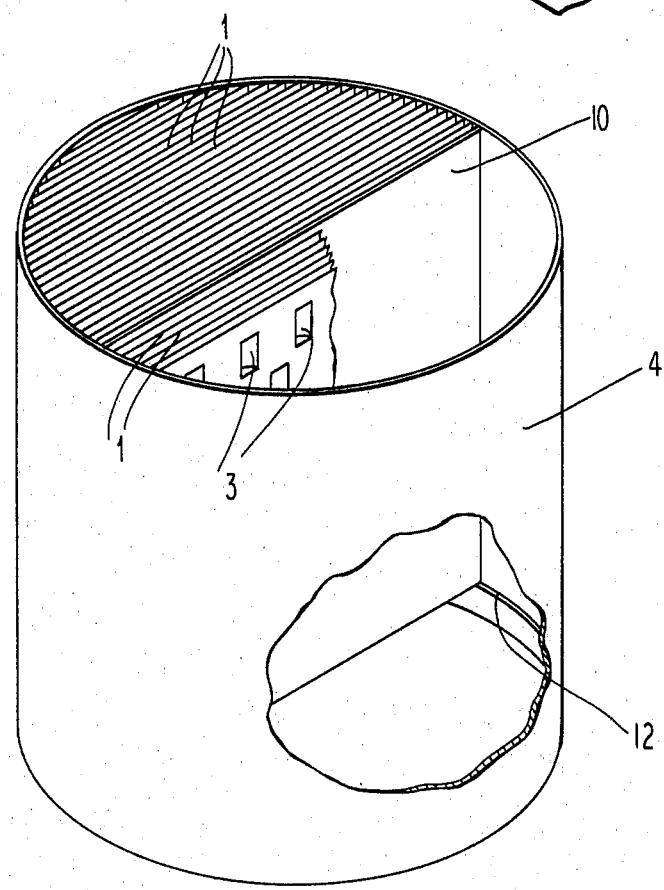
FIG. 2 is a partially cut-away perspective view of a catalyst support made according to the present invention.

In FIG. 2, there is shown a cylindrical frame for a metal catalyst support, the frame comprising cylindrical shell 4 and a partition 10, the partition 10 defining two semicircular regions within the shell 4. While the shell is illustrated as a right circular cylinder, it is understood that the term "cylinder", as used herein, refers to any surface generated by a straight line of constant spatial orientation. In the present invention, the partition 10 is parallel to the line which generates the cylindrical form of the shell.

FIG. 2 shows one of the semicircular regions packed with strips 1. The other region is also shown to have strips 1, and the indentations 3 are also visible. At the lower end of the shell 4, there is a flange 12 to retain the strips 1. A similar flange can be inserted in the upper end of the shell 4 after all of the strips 1 are in place.

The strips 1 are inserted by hand into the semicircular regions of the shell 4. Each strip 1 must be cut to fit within the space available to it. The amount by which each strip 1 must be cut is determined by conventional trigonometric calculations. That is, from a knowledge of the height of the indentations 3, which determines the separation between adjacent strips 1, one can calculate the width required for a strip in a given position within the shell 4. The strips are inserted one by one into the semicircular region, starting at the partition 10, and moving towards the outer portion of shell 4. Startng at the partition 10 and stacking toward the outer portion of shell 4 insures that the strips 1 lie flat and tightly packed. The strips 1 are resilient, and must be compressed to form a stack that is uniformly spaced. When the semicircular region is partly filled with strips 1, and a compressing force is directed towards the partition 10, all of the compressive force is exerted on the strips 1, and none of the force is absorbed by the shell 4. Thus the strips can be compressed uniformly along their length, and the spacing between strips 1 is uniform. Of course, after one semicircular region in FIG. 2 has been filled, the other region is filled in exactly the same way.

The shell 4 in FIG. 2 need not be a cylinder of circular cross section. As stated above, it could be any cylinder generated by a straight line that moves parallel to its original position. For example, the shell 4 could be elliptical, and the individual strips 1 could be cut to fit an elliptical cross section instead of a circular cross section.

Figure 3:
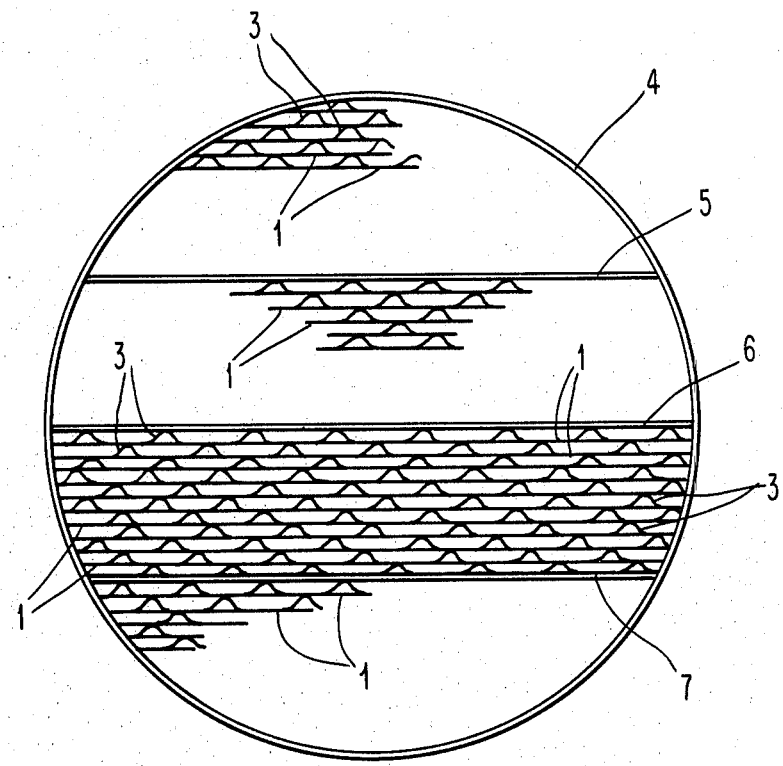
FIG. 3 is a plan view of a frame, for a catalyst support, having three partitions, and showing some of the spaces between partitions filled by stacks of indented strips.

The number of partitions used in a catalyst support according to the present invention can also be varied. For example, in the embodiment of FIG. 3, there are shown three partitions 5, 6, and 7, mounted on shell 4. FIG. 3, which is a plan view showing the cylinder as it would appear in the direction of the gas flow through the catalyst support, shows, in fragmentary form, some of the spaces between partitions filled with indented strips 1. The embodiment of FIG. 3, having three partitions, would be useful for constructing larger honeycombs.

It is understood that many modifications of the present invention are possible. The precise number of partitions can be varied, as described above. The shape of the shell can also be modified as indicated earlier. Different types of indentations can be used. What is essential is that the adjacent strips not nest together, in order to provide an unobstructed path for flow of gas. These and other modifications are intended to be within the spirit and scope of the invention, and within the coverage of the following claims.

What is claimed is:

1. A frame for a metal catalyst support, comprising a cylindrical shell and at least one partition that is parallel to the straight line that generates the cylindrical shell, wherein the frame encloses a plurality of indented metal strips, the strips being laid parallel to the partition, the strips being oriented so that indentations on adjacent strips do not coincide, so that adjacent strips cannot nest together.

2. The frame of claim 1 wherein the cylinder of the shell is a circular cylinder.

3. The frame of claim 2 having a partition along the axis of the circular cylinder of the shell.

4. The frame of claim 1 having a flange around the periphery of the shell on at least one end of the shell.

5. A method of forming a metal catalyst support, comprising the steps of:
cutting an indented metal strip to fit within a partitioned cylindrical shell,
placing the strip within the shell, and
repeating the cutting and placing steps, orienting each strip so that indentations on adjacent strips do not coincide and so that adjacent strips cannot nest together, until the space within a given partitioned area of the shell has been substantially filled.

6. The method of claim 5, further comprising repeating the cutting and placing steps so as to fill a second partitioned area of the shell.

7. A method of constructing a metal catalyst support, comprising the steps of:
laying an indented metal strip against a partition of a cylindrical frame, and
laying successive indented metal strips against the strip previously laid, each strip being oriented so that indentations on adjacent strips do not coincide, so that adjacent strips cannot nest together, until one partitioned region of the frame is filled.

8. The method of claim 7, wherein each laying step comprises compressing the strips to form a stack that is uniformly spaced.

9. A metal catalyst support comprising a cylindrical frame, the frame having at least one interior partition, the interior of the frame being divided, by partitioning, into at least two regions, and a plurality of indented metal strips, the strips being stacked within the regions within the frame and substantially filling the interior of the frame, wherein the indentations on the strips are positioned so that adjacent strips cannot nest together.

10. The catalyst support of claim 9, wherein the cylinder of the frame is a circular cylinder.

* * * * *